US012030518B2

(12) United States Patent
Wankhede et al.

(10) Patent No.: US 12,030,518 B2
(45) Date of Patent: Jul. 9, 2024

(54) LANE CHANGING BASED ONLY ON LOCAL INFORMATION

(71) Applicant: Atieva, Inc., Newark, CA (US)

(72) Inventors: Ajeet Ulhas Wankhede, San Jose, CA (US); Pinaki Gupta, Fremont, CA (US)

(73) Assignee: Atieva, Inc., Newark, CA (US)

( * ) Notice: Subject to any disclaimer, the term of this patent is extended or adjusted under 35 U.S.C. 154(b) by 296 days.

(21) Appl. No.: 17/301,540

(22) Filed: Apr. 6, 2021

(65) Prior Publication Data

US 2022/0315037 A1     Oct. 6, 2022

(51) Int. Cl.
*B60W 60/00*    (2020.01)
*G06V 20/56*    (2022.01)

(52) U.S. Cl.
CPC ......... *B60W 60/001* (2020.02); *G06V 20/588* (2022.01); *B60W 2420/403* (2013.01); *B60W 2552/30* (2020.02); *B60W 2554/4045* (2020.02)

(58) Field of Classification Search
CPC ........ B62D 15/0255; B60W 30/18163; B60W 60/001; B60W 2420/403; B60W 2552/30; B60W 2554/4045; G08G 1/167; G06V 20/588
See application file for complete search history.

(56) References Cited

U.S. PATENT DOCUMENTS

| | | |
|---|---|---|
| 6,076,030 A | 6/2000 | Rowe |
| 10,150,474 B2 | 12/2018 | Sterniak |
| 10,488,521 B2 | 11/2019 | Wang et al. |
| 10,634,772 B2 | 4/2020 | Eckstein et al. |

(Continued)

FOREIGN PATENT DOCUMENTS

| | | |
|---|---|---|
| DE | 102013020334 A1 | 8/2014 |
| EP | 3680877 A1 | 7/2020 |

(Continued)

OTHER PUBLICATIONS

International Search Report and Written Opinion for PCT Application No. PCT/US2022/071526, dated Jul. 20, 2022, 13 pages.

(Continued)

*Primary Examiner* — Kenneth J Malkowski
(74) *Attorney, Agent, or Firm* — Brake Hughes Bellermann LLP (57) ABSTRACT

A computer-implemented method comprises: initiating, by an assisted-driving system that is controlling motion of a vehicle, a lane change of the vehicle from an ego lane to a target lane, the lane change to be performed based only on local information of the vehicle; defining, by the assisted-driving system, a parametric representation of the target lane, the parametric representation based on first waypoints of the target lane; receiving, by the assisted-driving system and during the lane change, a first output of a perception component of the vehicle, the first output being the local information and reflecting second waypoints of the target lane; performing, by the assisted-driving system, a comparison based on the first output and the parametric representation; and providing, by the assisted-driving system, references of a first global path to controllers of the vehicle for actuating the lane change, the references selected based on the comparison.

20 Claims, 8 Drawing Sheets

(56) References Cited

U.S. PATENT DOCUMENTS

| | | |
|---|---|---|
| 10,705,528 B2 | 7/2020 | Wierzynski et al. |
| 2013/0338868 A1 | 12/2013 | Essame et al. |
| 2015/0161895 A1 | 6/2015 | You et al. |
| 2018/0051992 A1 | 2/2018 | Croyle |
| 2019/0138007 A1 | 5/2019 | Baghsorkhi et al. |
| 2019/0179311 A1 | 6/2019 | Paden |
| 2019/0391587 A1 | 12/2019 | Uvarov et al. |
| 2020/0086486 A1 | 3/2020 | Graichen et al. |
| 2020/0174492 A1 | 6/2020 | Lee et al. |
| 2020/0192391 A1 | 6/2020 | Vora et al. |
| 2020/0198657 A1 | 6/2020 | Manderla et al. |

FOREIGN PATENT DOCUMENTS

| | | |
|---|---|---|
| EP | 3692339 A1 | 8/2020 |
| EP | 3805073 A1 | 4/2021 |
| JP | 2000080673 A | 3/2000 |
| WO | 2006048310 A1 | 5/2006 |
| WO | 2019076044 A1 | 4/2019 |
| WO | 2020011025 A1 | 1/2020 |
| WO | 2020206071 A1 | 10/2020 |

OTHER PUBLICATIONS

Intellias: "Solving the Challenges of HD Mapping for Smart Navigation in Autonomous Cars," Blogpost, available online at: <https://www.intellias.com/solving-the-challenges-of-hd-mapping-for-smart-navigation-in-autonomous-cars/>, May 12, 2020, 9 pages.

D. Ren et al.: "Trajectory Planning for Vehicle Lane Changing on Circular Road in Automated Highway System," IOSR Journal of Electrical and Electronics Engineering (IOSR-JEEE), vol. 14, Issue 6 Ser. I (Nov.-Dec. 2019), pp. 25-37.

H. Bai et al.: "Accelerated Lane-Changing Trajectory Planning of Automated Vehicles with Vehicle-to-Vehicle Collaboration," Hindawi, Journal of Advanced Transportation, vol. 2017, Article ID 8132769, 12 pages, https://doi.org/10.1155/2017/8132769.

LANE CHANGING BASED ONLY ON LOCAL INFORMATION

TECHNICAL FIELD

This document relates to lane changing that is based only on local information.

BACKGROUND

Some vehicles manufactured nowadays are equipped with one or more types of systems that can at least in part handle operations relating to the driving of the vehicle. The level of driving autonomy provided can vary between such systems to a significant extent. Some existing approaches to assisted driving provide vehicle localization using a global positioning system (GPS) receiver together with a high-definition map. However, such technology can be costly to implement in a vehicle. Moreover, high-definition maps may not be readily available for all areas, which can place limitations on or prevent the use of assisted driving.

SUMMARY

In a first aspect, a computer-implemented method comprises: initiating, by an assisted-driving system that is controlling motion of a vehicle, a lane change of the vehicle from an ego lane to a target lane, the lane change to be performed based only on local information of the vehicle; defining, by the assisted-driving system, a parametric representation of the target lane, the parametric representation based on first waypoints of the target lane; receiving, by the assisted-driving system and during the lane change, a first output of a perception component of the vehicle, the first output being the local information and reflecting second waypoints of the target lane; performing, by the assisted-driving system, a comparison based on the first output and the parametric representation; and providing, by the assisted-driving system, references of a first global path to controllers of the vehicle for actuating the lane change, the references selected based on the comparison.

Implementations can include any or all of the following features. The comparison is performed to find a best fit for the second waypoints among the first waypoints. The first global path is defined at an outset of the lane change, the computer-implemented method further comprising defining, by the assisted-driving system, a transformation matrix between an origin of the lane change and each of multiple points along the first global path. The computer-implemented method further comprises using the transformation matrix in defining the parametric representation. The parametric representation comprises coefficients for a polynomial. The polynomial is a third-order polynomial. The first output includes first x,y-coordinates, the computer-implemented method further comprising generating second x,y-coordinates from the parametric representation, wherein the comparison is performed using the first and second x,y-coordinates. The parametric representation forms a plurality of first curves, wherein the first output forms a second curve, and wherein the comparison seeks to match the second curve to at least one of the plurality of first curves. The computer-implemented method further comprises forming a coefficient matrix of the coefficients. The controllers include at least a steering control or an acceleration control. The comparison includes a determination whether the second waypoints are within a threshold of at least one set of the first waypoints. The first global path is defined at an outset of the lane change, wherein the comparison matches the second waypoints with a first set of the first waypoints, the first set of the first waypoints associated with a first point along the first global path, and wherein the references are selected from the first global path beginning at the first point. The references are selected from the first global path beginning at the first point although the vehicle is not at a location corresponding to the first point. The computer-implemented method further comprises receiving a second output of the perception component, and repeating the comparison based on the second output, wherein if the threshold is not met for the second output, a second global path is defined. Performing the comparison comprises performing a one-directional search of the first waypoints. The comparison indicates that the second waypoints are not within the threshold of any set of the first waypoints, the computer-implemented method further comprising defining the first global path in response to the comparison. The first global path is defined to replace a second global path that had been defined earlier in the lane change.

In a second aspect, a computer program product tangibly is embodied in a non-transitory storage medium, the computer program product including instructions that when executed cause a processor to perform operations, the operations comprising: initiating, by an assisted-driving system that is controlling motion of a vehicle, a lane change of the vehicle from an ego lane to a target lane, the lane change to be performed based only on local information of the vehicle; defining, by the assisted-driving system, a parametric representation of the target lane, the parametric representation including first waypoints of the target lane; receiving, by the assisted-driving system and during the lane change, a first output of a perception component of the vehicle, the first output being the local information and reflecting second waypoints of the target lane; performing, by the assisted-driving system, a comparison based on the first output and the parametric representation; and providing, by the assisted-driving system, references of a first global path to controllers of the vehicle for actuating the lane change, the references selected based on the comparison.

In a third aspect, a vehicle comprises: controllers configured for use in controlling motion of the vehicle with regard to a lane change of the vehicle from an ego lane to a target lane, a parametric representation of the target lane, the parametric representation including first waypoints of the target lane; a perception component configured to generate local information reflecting second waypoints of the target lane; and means for actuating the lane change of the vehicle based only on the local information.

Implementations can include any or all of the following features. The controllers include at least a steering controller; the perception component includes at least one of a camera and a lidar; and the means actuates the lane change by defining the parametric representation, receiving the local information from the perception component, performing a comparison based on the local information and the parametric representation, and providing references of a global path to the controllers, the references selected based on the comparison.

BRIEF DESCRIPTION OF DRAWINGS

Like reference symbols in the various drawings indicate like elements.

DETAILED DESCRIPTION

This document describes examples of systems and techniques providing lane change for a vehicle controlled by an assisted-driving (AD) system, the lane change performed based only on local information. In some implementations, the vehicle can be allowed to proceed based on the original definition of a global path, as long as the vehicle's departure from that global path does not exceed a threshold. The AD system can perform a fitting of detected sensor parameters to aspects of the defined global path, and proceed without redefining as long as the fit is good enough. For example, this can allow the AD system to control the vehicle during a lane change without resorting to localization tools such as a GPS receiver or a high-definition map.

To execute an autonomous lane change, the ego vehicle can follow the planned path (the global path) closely. During a lane change a motion planner can go through a number of iterations as part of controlling the vehicle. In each iteration, a path can be generated with updated sensor information and in an updated ego frame. However, the new path should match closely with the global path. The present subject matter enables creation of a local path preserving the shape of the global path while relying solely on sensor information available in local frame.

The following example illustrates that the ego vehicle does not necessarily follow the global path exactly. The controllers tasked with trajectory tracking can make use of a kinematic/dynamic model of the vehicle in executing the lane change according to the global path. In so doing, the controllers can seek to compensate for the delays in the vehicle actuators and other unintended circumstances. However, due to the inherent inaccuracies of modeling and/or estimation of vehicle parameters, the actual path followed by the ego vehicle can become offset from the planned path at one or more points during the lane change. In such situations a new path can sometimes be generated. The new path can still comfortably preserve the original shape of the planned path to the extent possible.

If the vehicle follows a global path during the lane change, the vehicle's behavior can provide a human-like lane change experience. Namely, the global path may have been designed to be smooth and comfortable, and may therefore be persistent temporally. By contrast, if the vehicle had been entirely controlled by local planning during the lane change maneuver, the experience may have been different from how a human usually drives and may have been uncomfortable to the passenger. This is because a lane change that is entirely based on local planning is recalculated at each planning step and does not have a global plan from beginning to end of the lane change. As a result, such a local-plan lane change can feel robotic to the passenger. On the other hand, a true global plan can be achieved only with a global localization capability, which may require complex and costly components or services such as a high-quality GPS receiver or HD maps. However, the present subject matter can use local information to derive a globally persistent plan, and thereby provide a better lane change experience.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "passenger" of the vehicle, regardless whether the person is driving the vehicle, or whether the person has access to controls for driving the vehicle, or whether the person lacks controls for driving the vehicle. In examples herein, the vehicle that is the subject of the example is sometimes referred to as the "ego vehicle". One or more other vehicles are sometimes referred to as a "target vehicle". Multiple vehicles in the present examples are illustrated as being similar or identical to each other for illustrative purposes only.

Examples herein refer to assisted driving (e.g., as performed by an AD system). Assisted driving involves at least partially automating one or more dynamic driving tasks. An ADAS can perform assisted driving and is an example of an assisted-driving system. Assisted driving is performed based in part on the output of one or more sensors typically positioned on, under, or within the vehicle. While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples herein refer to local information. Local information includes data generated by perception components such as a camera or lidar that are situated within or on the vehicle. A GPS receiver, by contrast, generates an output that is not local information (e.g., it can be characterized as global information) because it requires the presence of satellites to generate the signals being received. For example, a camera detects incoming light but does not necessarily require any particular technology external to the vehicle to generate that light. A lidar, moreover, transmits light from the vehicle in order to detect its reflections, but also does not necessarily require any particular technology external to the vehicle. Reliance only on local information also does not include use of a high-definition map of the roadway. As used herein, a high-definition map is a depiction of the roadway that has a decimeter-scale resolution or higher. For example, the present subject matter does not involve use of so-called high definition maps (HD-maps) by the AD system in controlling the vehicle to perform a lane change.

Examples herein refer to a lane for a vehicle. As used herein, a lane is a path traveled by a vehicle currently, in the past, or in the future; the path where the vehicle is currently located can be referred to as an ego lane. By contrast, a lane towards which the vehicle may be directed to travel is sometimes referred to as a target lane. A lane may be, but is not necessarily, defined by one or more markings on or adjacent the roadway. The distinction between one lane and another lane can be visually noticeable to a passenger, or can be solely defined by the AD system, to name just two examples. A lane as used herein includes a straight roadway (e.g., free of turns) and a roadway making one or more turns. A lane as used herein can be part of a roadway that is restricted to one-way travel (e.g., a one-way street), or can be part of a roadway allowing two-way traffic. A lane as used herein can be part of a roadway that has only a single lane, or that has multiple lanes. In the present subject matter, an ego lane and a target lane can be, but are not necessary, essentially parallel to each other. For example, one of the ego lane and the target lane can form a nonzero angle relative to the other.

Examples herein refer to a sensor. A sensor is configured to detect an event and/or a change in one or more aspects of its environment and output signal(s) reflecting the detection. As illustrative examples only, a sensor can indicate one or more of a distance between the vehicle and an object, a speed of the vehicle, a trajectory of the vehicle, or an acceleration of the vehicle. Examples of sensors that can be used with one or more embodiments include, but are not limited to: a light sensor (e.g., a camera); a scanning system (e.g., lidar); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); a torque sensor; a temperature sensor (e.g., a primary or secondary thermometer); a pressure sensor (e.g., for ambient air or a component of the vehicle); a humidity sensor (e.g., a rain detector); or a seat occupancy sensor.

Figure 1:
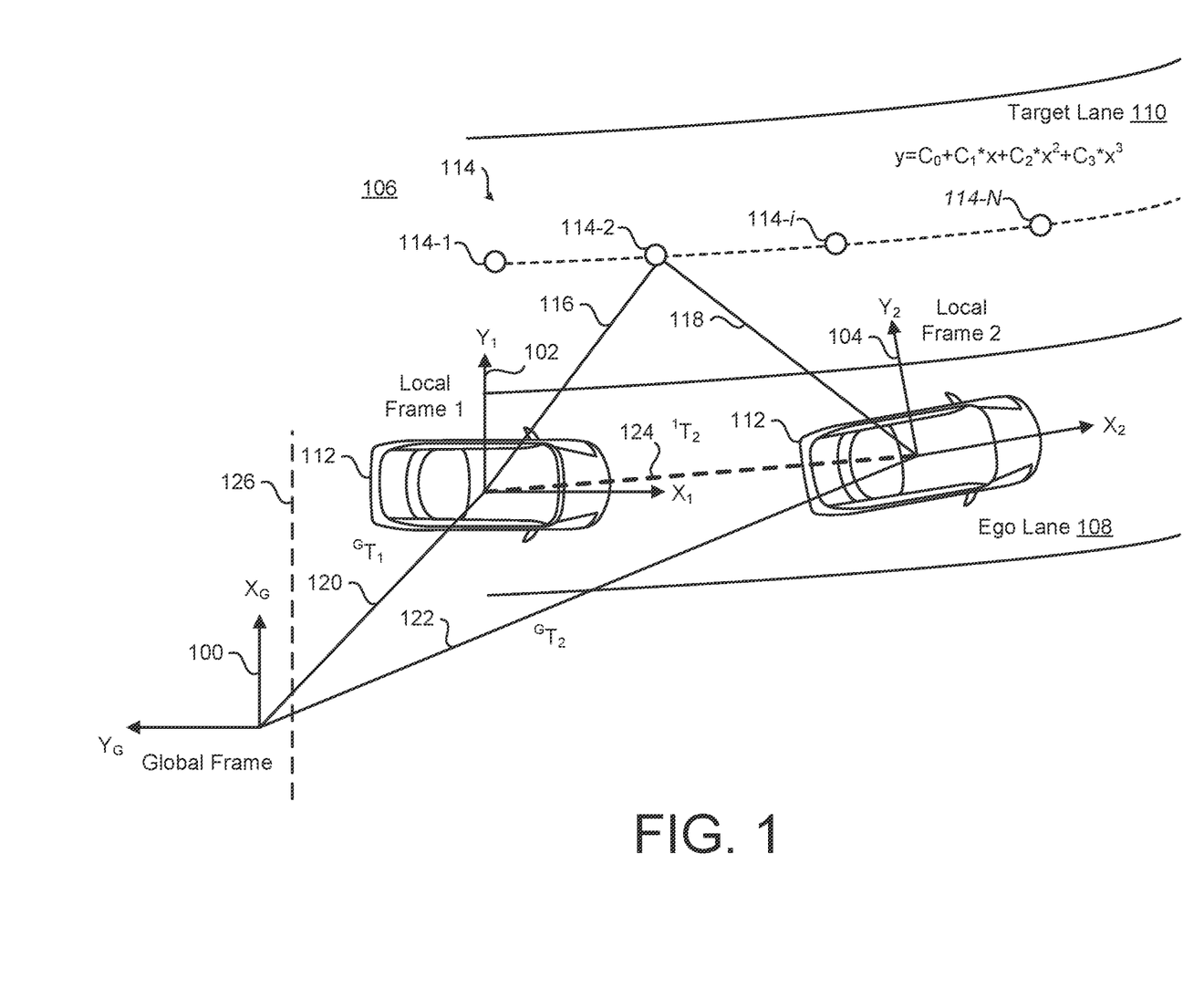
FIG. 1 shows an example of a global frame and local frames.

FIG. 1 shows an example of a global frame 100 and local frames 102 and 104. The examples described with reference to the global frame 100, local frame 102, and/or local frame 104 can be used with one or more other examples described elsewhere herein. Each of the global frame 100 and local frames 102 and 104 can be represented by a coordinate system (e.g., with Cartesian coordinates). For example, the global frame 100 can be defined for use of so-called "east, north, up" (ENU) coordinates.

The global frame 100 and local frames 102 and 104 are here defined relative to an environment 106 that is schematically shown from above to include at least an ego lane 108 and a target lane 110. The environment 106 can include a roadway, including, but not limited to, a street, alley, road, highway, or a freeway, to name just a few examples. A vehicle 112 having an AD system (e.g., that can perform motion planning as described below with reference to FIG. 8) is currently located in the ego lane 108. For example, the vehicle 112 is traveling, under control of the AD system, along the ego lane 108 in a direction from left to right in the illustration.

As part of controlling the motion of the vehicle 112, the AD system can perform one or more tasks. One example of such a task is a lane change. In some implementations, the AD system can plan the action of controlling the vehicle 112 to perform a lane change from the ego lane 108 to the target lane 110. For example, this action can be triggered by a user input indicating that a lane change should be performed. As another example, the AD system can plan the lane change without being directly triggered by a user (e.g., based on following a defined navigation route). During a lane change, in every iteration of the motion planner, the motion planner may be required to generate a path with updated sensor information and in the updated ego frame (e.g., the local frame 102 or 104). However, the new path should match closely with the path planned when the lane change was initiated (defined in the global frame 100). The present subject matter can enable the AD system to create a local path that preserves the shape of the global path, relying solely on local information (e.g., on sensor information available in the local frame).

Here, to manage the lane change (and optionally for other purposes), the AD system can define waypoints 114 regarding the target lane 110. Any number of the waypoints 114 can be defined, as schematically illustrated here by waypoints 114-1, 114-2, . . . , 114-$i$, . . . and 114-N, respectively, where N is any integer greater than unity and $1 \leq i \leq N$. The waypoints 114 can be computer-based definitions (e.g., with reference to the global frame 100). For example, the AD system can seek to place the waypoints 114 at a transverse center of the target lane 110 so that a given waypoint 114-$i$ is essentially equally far from the left and right side boundaries of the target lane 110. In some implementations, the waypoints 114 can be defined as a polynomial. Any order of polynomial can be used. For example, the waypoints 114 can be defined as a third-order polynomial:

$$y = C_0 + C_1 * x + C_2 * x^2 + C_3 * x^3,$$

where x and y are spatial coordinates and $C_i$ (i=0,1,2,3) are the target lane coefficients.

Some transformations will now be described for explanatory purposes. Line 116 connects the vehicle 112 (e.g., the center of gravity thereof) with the waypoint 114-2 when the vehicle 112 is positioned according to local frame 102. Similarly, line 118 connects the vehicle 112 with the waypoint 114-2 when the vehicle 112 is positioned according to local frame 104. A transformation 120 (sometimes referred to as $^G T_1$) represents the transformation from the local frame 102 to the global frame 100. Similarly, a transformation 122 (sometimes referred to as $^G T_2$) represents the transformation from the local frame 104 to the global frame 100. A transformation 124 (sometimes referred to as $^1 T_2$) represents the transformation from the local frame 104 to the local frame 102. However, the transformation 124 may be unknown to the AD system.

For general highway driving scenarios, the lane geometry often can be expressed as a third order polynomial in the ego body frame. However, to track a path in different frames may require knowledge about the transformation matrix. As indicated above, due to inaccuracies the vehicle placement can diverge somewhat from the planned path, and the transformation may not be reliably and accurately available from the GPS or inertial measurement unit (IMU) sensors. However, detection of lane markings through fusion of camera and lidar can be performed, such as by use of machine learning techniques. The present subject matter can therefore extract the transformation using local information, and thereby provide a passenger experience that is more smooth and human-like than with pure local planning, because it seeks to conform to the global path within one or more thresholds.

Most of the sensor information that may typically be available in the vehicle 112 may be received in the corresponding local frame of the vehicle 112. In some implementations, this can include, but is not limited to, outputs from a camera, lidar, and/or radar. That is, this local information relates to the local frame 102 or 104, as the case may be. A GPS receiver, on the other hand, may provide information only relative to the global frame 100. Moreover, some GPS receivers may not have sufficient accuracy to provide a global transformation between any two frames. For example, this is why the transformation 124 can be said to be unknown to the AD system. Systems and techniques described herein can provide lane changes for a vehicle based only on local information, which is here schematically illustrated by a dashed line 126 signifying that the local frames 102 and 104, but not the global frame 100, are involved. For example, a system can extract information between the local frames 102 and 104 using only information available from sensors in the local (not global) context, and without using features such as a high-fidelity GPS or HD-maps.

Figure 2:
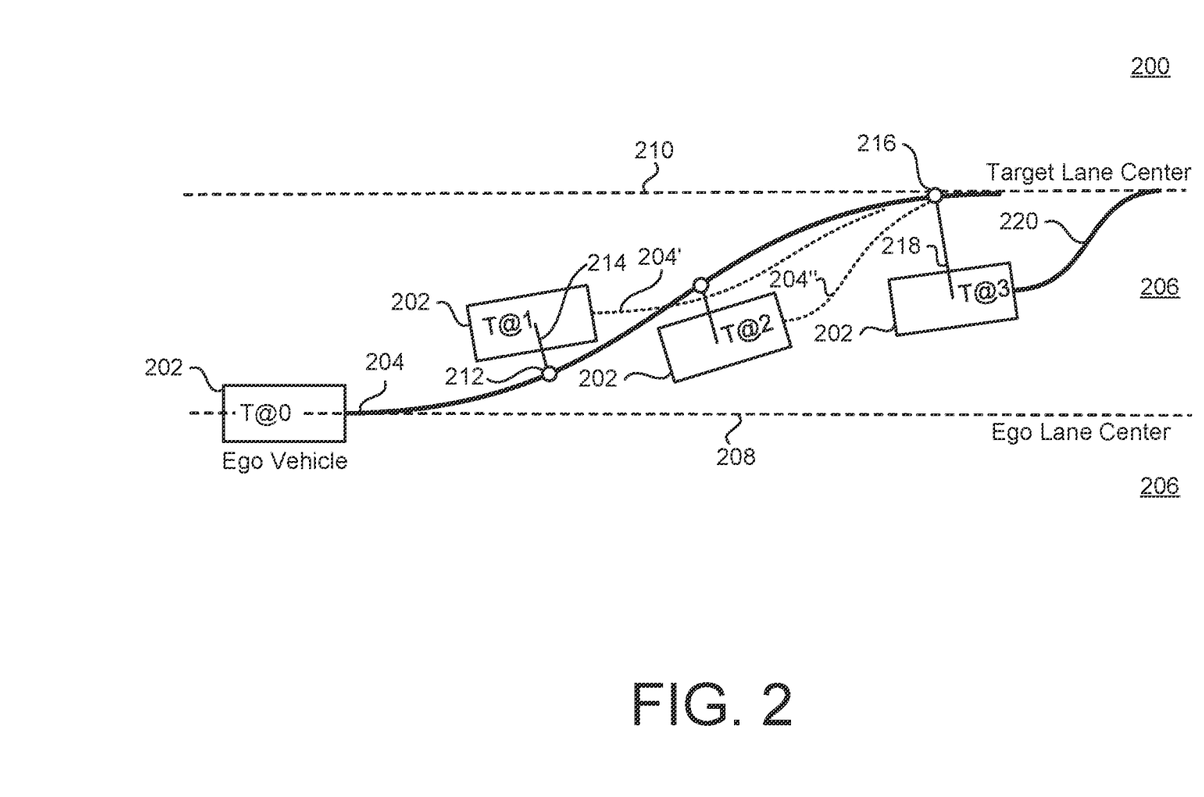
FIG. 2 shows an example of controlling motion of a vehicle with reference to a global path.

FIG. 2 shows an example 200 of controlling motion of a vehicle 202 with reference to a global path 204. The example 200 or aspects thereof can be used together with one or more other examples described elsewhere herein. The example 200 involves the vehicle 202 traveling on a roadway 206 as shown from above, and an ego lane center 208 and a target lane center 210 have been defined relative to the roadway 206.

The global path 204 can be defined or otherwise created, such as by a motion planner of an AD system, in preparation for controlling the vehicle 202 to undergo a lane change from the ego lane center 208 to the target lane center 210. The time when the global path 204 is defined by the AD system can nominally be referred to as time zero (in the illustration represented as "T@0"). The global path 204 can join the ego lane center 208 and the target lane center 210 to each other. The global path 204 can have any of multiple shapes, depending on the circumstances, including, but not limited to, characteristics such as the type of the vehicle 202, the speed of the vehicle 202, the spatial configuration of the ego lane center 208 and the target lane center 210, visibility, traffic on the roadway 206, and/or weather conditions, to name just a few examples. For example, the global path 204 can be an S-shaped curve.

The example 200 schematically shows the vehicle 202 at respective times after the initial time T@0, such times here labeled T@1, T@2, and T@3, respectively. These times are chosen for purposes of illustration only and do not necessary reflect every iteration of the motion planner; rather, the motion planner may perform multiple iterations (e.g., tens or hundreds of iterations) per second. As such, the decisions discussed in this example can be performed also at other times than the ones illustrated in the example 200 (e.g., also at intermediate times).

Each point along the global path 204 can be considered a separate state for the vehicle 202, each such state corresponding to a local frame. At each state, the motion planner can consider what path it should deliver to the controllers. Generally, if the vehicle 202 is closely following the global path 204, then it is better to generate a path similar or identical to the global path 204 in the new frame. This can help the controllers to track better since the reference would not be constantly changing in a global frame. The times T@1 and T@2 illustrate example scenarios of this type. At T@1, the AD system can determine whether the vehicle 202 remains within a threshold of the global path 204. This is done using local information only, such as the output of a camera and/or a lidar. A state 212 on the global path 204 can here correspond to the nearest point on the global path 204 to the current location of the vehicle 202. For example, the state 212 can include spatial coordinates (e.g., x and y positions) and a heading angle. An offset 214 between the vehicle 202 and the state 212 here schematically illustrates the current separation of the vehicle 202 from the global path 204. The offset 214 can reflect spatial position and/or heading angle, to name two examples. If the offset 214 does not exceed a particular threshold at T@1, the AD system can at T@1 continue to provide a remainder of the global path 204 to the controllers of the vehicle 202. That is, while the vehicle 202 at T@1 is not exactly at the state 212 according to the local information, its position is sufficiently close that the AD system chooses to continue using the remainder of the global path 204 for controlling the motion of the vehicle 202. By contrast, if the AD system at T@1 had decided to generate a new global path, then it may have generated new global path 204' which is shown as a dashed line. However, proceeding according to the new global path 204' may involve a more abrupt maneuver (e.g., a faster lateral displacement and/or greater velocity change) than to continue using the remainder of the global path 204. As such, it may be a superior riding experience for the passenger to have the vehicle 202 be controlled according to the global path 204 at the time T@1 than the new global path 204'.

In a similar way, at T@2 the AD system can again determine whether the vehicle 202 remains within the threshold of the global path 204 using local information only. If the threshold is not exceeded at T@2, the AD system can at T@2 continue to provide a remainder of the global path 204 to the controllers of the vehicle 202. That is, the AD system at T@2 does not generate a new global path 204" which is shown as a dashed line.

However, if the vehicle 202 at some point undergoes a greater departure from the global path 204 the motion planner can generate a new path at that point. At T@3, the AD system can determine whether the vehicle 202 remains within the threshold of the global path 204. This is done using local information only, such as the output of a camera and/or a lidar. A state 216 on the global path 204 can here correspond to the nearest point on the global path 204 to the current location of the vehicle 202. For example, the state 216 can include spatial coordinates (e.g., x and y positions) and a heading angle. An offset 218 between the vehicle 202 and the state 216 here schematically illustrates the current separation of the vehicle 202 from the global path 204. If the offset 218 exceeds the particular threshold at T@3, the AD system can at T@3 generate a new global path 220 for the vehicle 202. That is, the vehicle 202 currently has such separation from the state 216 according to the local information that the AD system should not continue using the remainder of the global path 204 for controlling the motion of the vehicle 202. Rather, the AD system will provide the new global path 220 to the controllers for guiding the vehicle 202, potentially through the rest of the lane change, as determined by subsequent iterations of the motion planner. For example, as long as the vehicle 202 remains within a threshold of the new global path 220, the AD system can continue providing a remainder of the new global path 220 to the controllers for maneuvering the vehicle 202.

Figure 3:
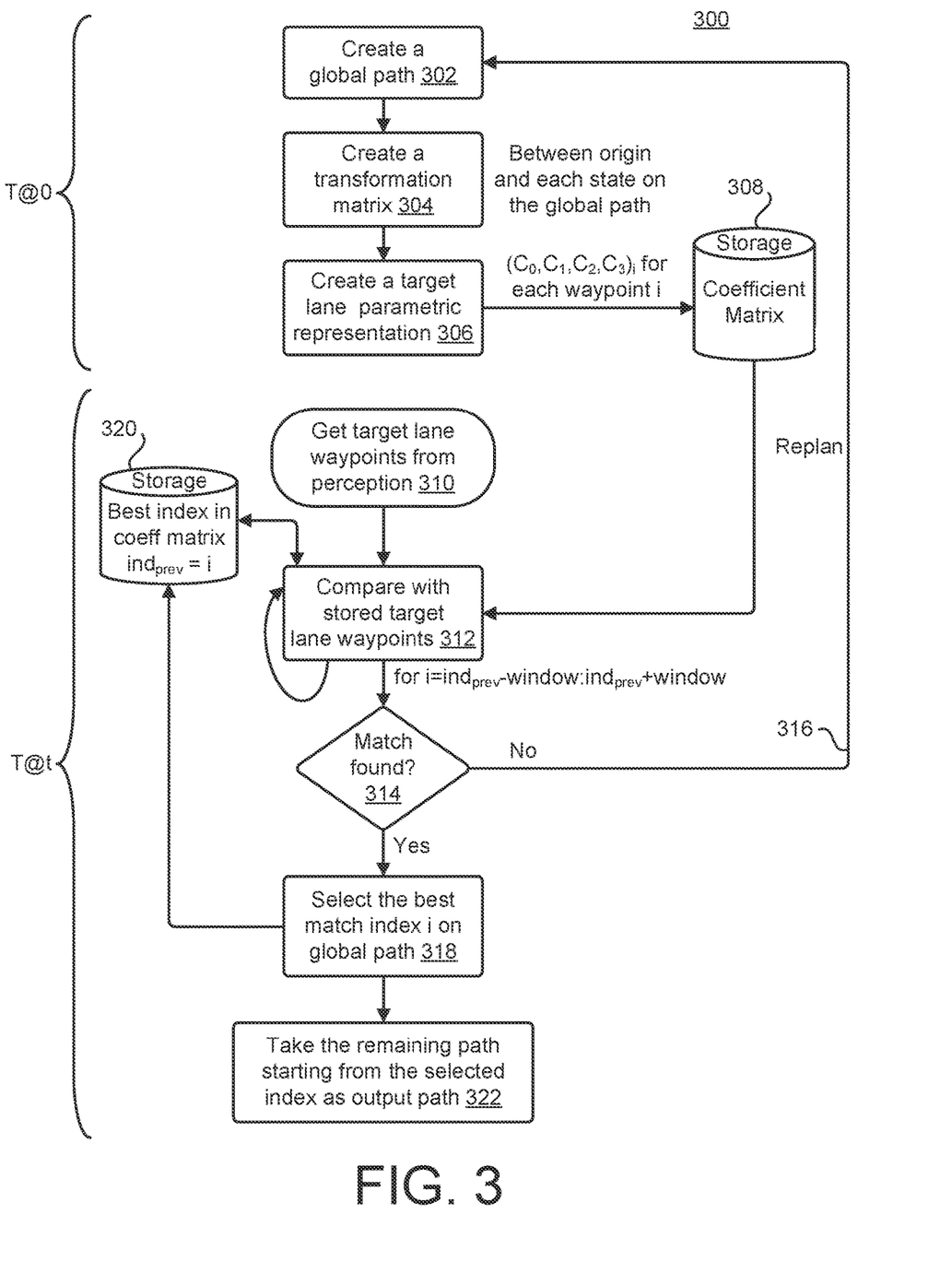
FIG. 3 shows a flowchart of an example of a method.

FIG. 3 shows a flowchart of an example of a method 300. The method 300 can be used together with one or more other examples described herein. More or fewer operations than shown can be performed. Two or more operations can be performed in a different order unless otherwise indicated.

The method 300 is illustrated as being performed during the course of at least two distinguishable instances or periods of time, here conceptually referred to as T@0 and T@t, respectively. In some implementations, T@0 can refer to an initial moment in time (e.g., at an outset of the lane change), and T@t can refer to any of multiple subsequent moments or periods of time. That is, at least the operations at T@t can be repeated one or more times during the course of a lane change.

Figure 4:
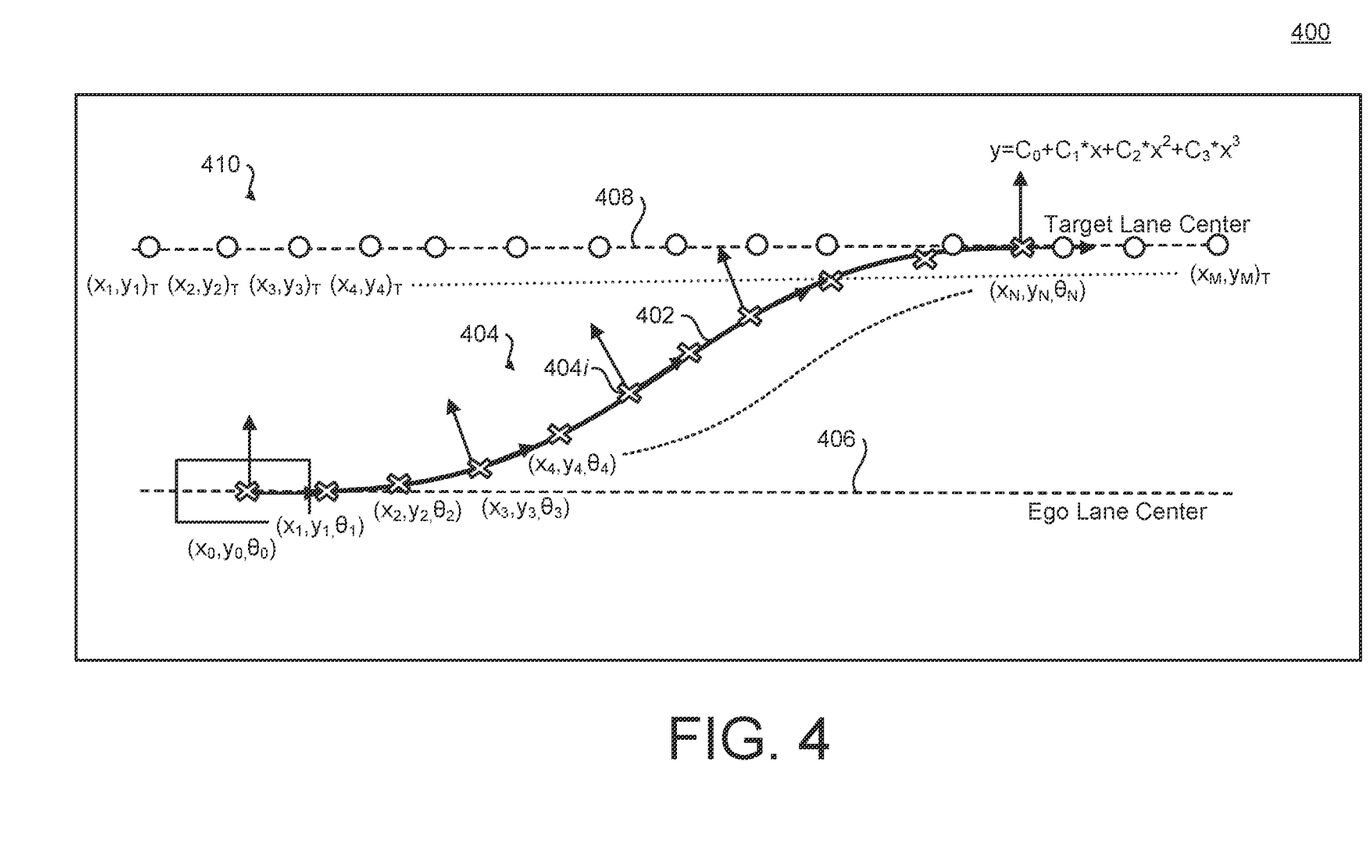
FIG. 4 shows an example of creating a global path.

At operation 302, a global path can be created. In some implementations, the global path 204 or the new global path 220 in FIG. 2 can be created. For example, the global path can define a route for a lane change from an ego lane to a target lane. FIG. 4 shows an example 400 of creating a global path 402. The example 400 can be used with one or more other examples described elsewhere herein.

At operation 304, transformations can be created. In some implementations, the transformations are between an origin of the lane change and each state along the global path. For example, the transformations can be generated in form of a transformation matrix. The example 400 shows the global path 402 as including states 404. Each of the states 404 corresponds to one of the transformations for the global path and can include coordinate frame representations. For example, any state 404$i$ can be represented in the form $(x_i, y_i, \theta_i)$, where x and y denote the point on the global path, $\theta$ denotes the heading angle of the vehicle in that state, and i is the index of the state. In FIG. 4, states $(x_0, y_0, \theta_0)$, $(x_1, y_1, \theta_1)$, $(x_2, y_2, \theta_2)$, $(x_3, y_3, \theta_3)$, $(x_4, y_4, \theta_4)$, . . . , $(x_N, y_N, \theta_N)$ are shown, for example, where N is the total number of states in the global path as planned.

The lane change can be defined so that the global path 402 extends between an ego lane center 406 of an ego lane, and a target lane center 408 of a target lane towards which the vehicle is heading. Waypoints 410 can be defined for the target lane. In some implementations, the waypoints 410 are defined to be at the target lane center 408. For example, each of the waypoints 410 can be represented in the form $(x_i, y_i)_T$, where x and y denote the waypoint, i is the index of the waypoint, and T indicates that the waypoint is in the target lane, for example to distinguish it from the states $(x_i, y_i, \theta_i)$ of the global path 402. In FIG. 4, waypoints $(x_1, y_1)_T$, $(x_2, y_2)_T$, $(x_3, y_3)_T$, $(x_4, y_4)_T$, . . . , $(x_M, y_M)_T$ are shown, for example, where M is the total number of waypoints identified for the global path as planned.

Figure 5:
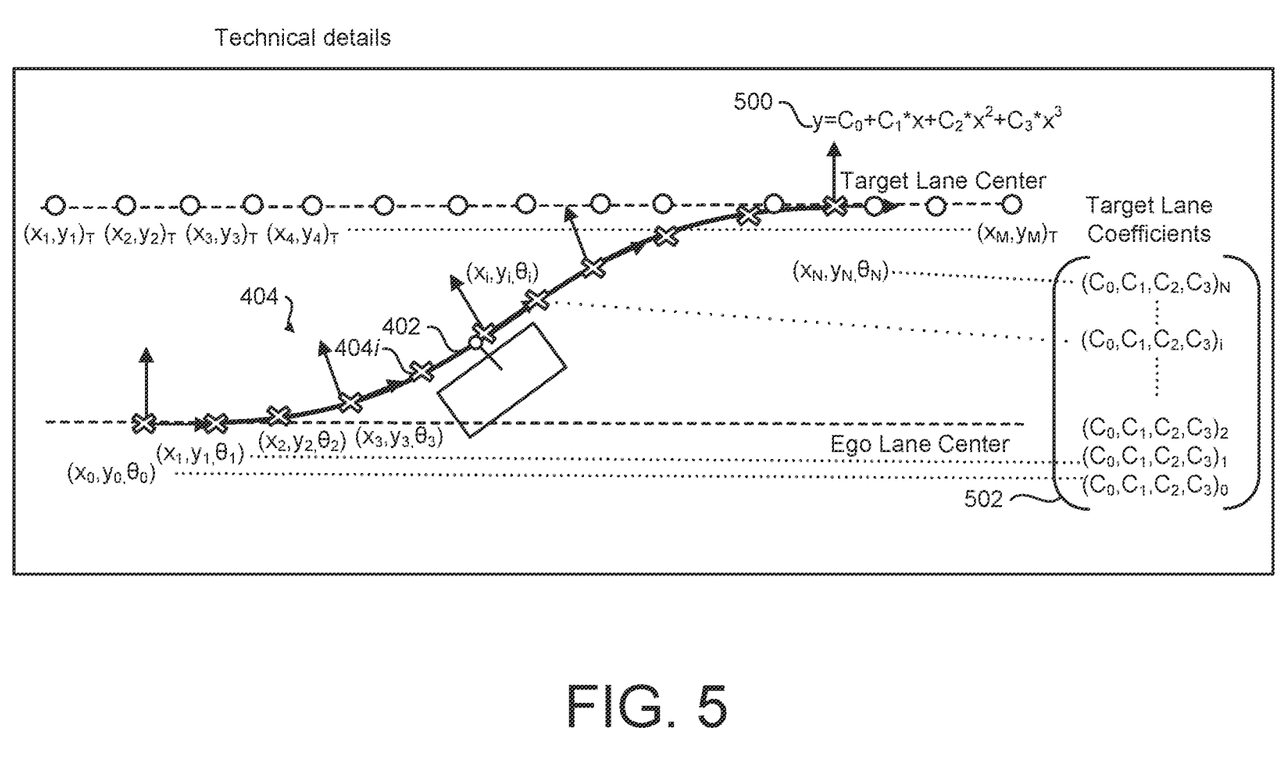
FIG. 5 shows an example of controlling motion of a vehicle with reference to the global path of FIG. 4.

At operation 306, a parametric representation of the target lane can be created. FIG. 5 shows an example of controlling motion of a vehicle with reference to the global path 402 of FIG. 4. The waypoints 410 of the target lane center 408 can be used to fit a polynomial 500, including, but not limited to, a third-order polynomial. For each state 404$i$ on the trajectory, one can find the transformed target waypoints and fit a polynomial. Moving along the entire trajectory one can generate a matrix 502 of coefficients corresponding to the discretized states. The matrix 502 can generally be represented as follows:

$$\begin{bmatrix} (C_0, C_1, C_2, C_3)_N \\ \vdots \\ (C_0, C_1, C_2, C_3)_i \\ \vdots \\ (C_0, C_1, C_2, C_3)_2 \\ (C_0, C_1, C_2, C_3)_1 \\ (C_0, C_1, C_2, C_3)_0 \end{bmatrix},$$

where the index 0, 1, 2, . . . , N corresponds to the discretized state of the global path 402, as also indicated by dotted lines between the matrix 502 and some of the states 404 in FIG. 5. The matrix 502 indicates what the waypoints 410 look like at the respective states 404. In the method 300, the matrix 502 can be stored in a storage 308. The above operations can be performed at T@0 as indicated in the method 300. That is, during the time T@0 the global planning can be performed and the necessary data (e.g., the global path 402, the states 404, the waypoints 410, and the matrix 502) can be generated and stored for use by the AD system in executing the lane change.

At any time T@t occurring after T@0, the method 300 can include an operation 310 of obtaining target lane waypoints from a perception component. The output of the perception component can be considered local information to the vehicle and can be used for determining whether the vehicle is sufficiently close to the global path 402 as planned. For example, the output of the perception component can reflect waypoints of the target lane center 408 as viewed from the vehicle's current position.

At operation 312, the waypoints of the perception component can be compared with stored target lane waypoints. In some implementations, this includes a comparison involving the coefficients of the matrix in the storage 308 and corresponding coefficients from the output of the perception component. The coefficients of the perception output can be compared to the matrix 502 to find a best fit or closest match. For example, the coefficients obtained from the perception component can be referred to as $(C_0, C_1, C_2, C_3)_{perc}$, and can be compared to the target lane coefficients $(C_0, C_1, C_2, C_3)$, for some or all applicable values of the index i. For example, the closest matching row in the matrix 502 can be identified. As another example, the coefficient matrix can be unrolled to get a set of spatial values (e.g., x,y-coordinates), and these can be compared to the x,y-coordinates from the perception component. The above or other examples can be applied to determine whether the waypoints reported by the perception component are within a threshold of any of the waypoints of the coefficient matrix.

Any of multiple approaches of comparison can be used. In some implementations, a minimization and/or maximization technique can be used. For example, a least squares analysis can be applied to a difference between the output of the perception component and some or all entries in the matrix 502. As another example, a comparison between curves (e.g., curve matching) can be performed. For example, the coefficient matrix reflects the appearance of the target lane from respective frames of the global path, and the comparison can take the view of the target lane as reported by the perception component and determine which of some or all curves of the coefficient matrix is most similar.

The coefficient matrix can be searched in a particular way, and/or only part of the coefficient matrix may be searched. For example, the search can be parallelized. As another example, the search can be performed only in one direction (e.g., a one-directional search) within the matrix. In some implementations, the operation 312 can look only at entries in the matrix 502 that are "forward" of a most recently identified matrix entry. For example, if one of the entries of the matrix 502 was identified as the closest match in an immediately preceding frame, then the comparison in operation 312 in the current frame can begin with an entry following the identified entry. In some implementations, the operation 312 can look only at entries in the matrix 502 in a number of iterations as follows:

for $i=ind_{prev}-\text{window}:ind_{prev}+\text{window}$, where i is an index for the matrix entries to be considered in the evaluation, such index to be iterated between the values defined before and after the colon; $ind_{prev}$ is the index of the previously identified closest matrix entry; and window is the range of matrix entries (e.g., one or more entries) to be searched on either side of the previous match. Other approaches can be used.

At operation 314, it can be determined whether a match has been found in the coefficient matrix. In some implementations, one or more thresholds can be applied. For example, it can be determined whether the waypoints reported by the perception component is within a threshold of any of the entries in the matrix 502. Any of multiple metrics can be used for the determination. Least squares was mentioned in an example above. Curve matching can be performed. As another example, another metric based on quantifying the difference between the perception waypoints and the parametric representation can be used, including, but not limited to, a distance-based evaluation.

Figures 6, 7A, 7B, 7C:
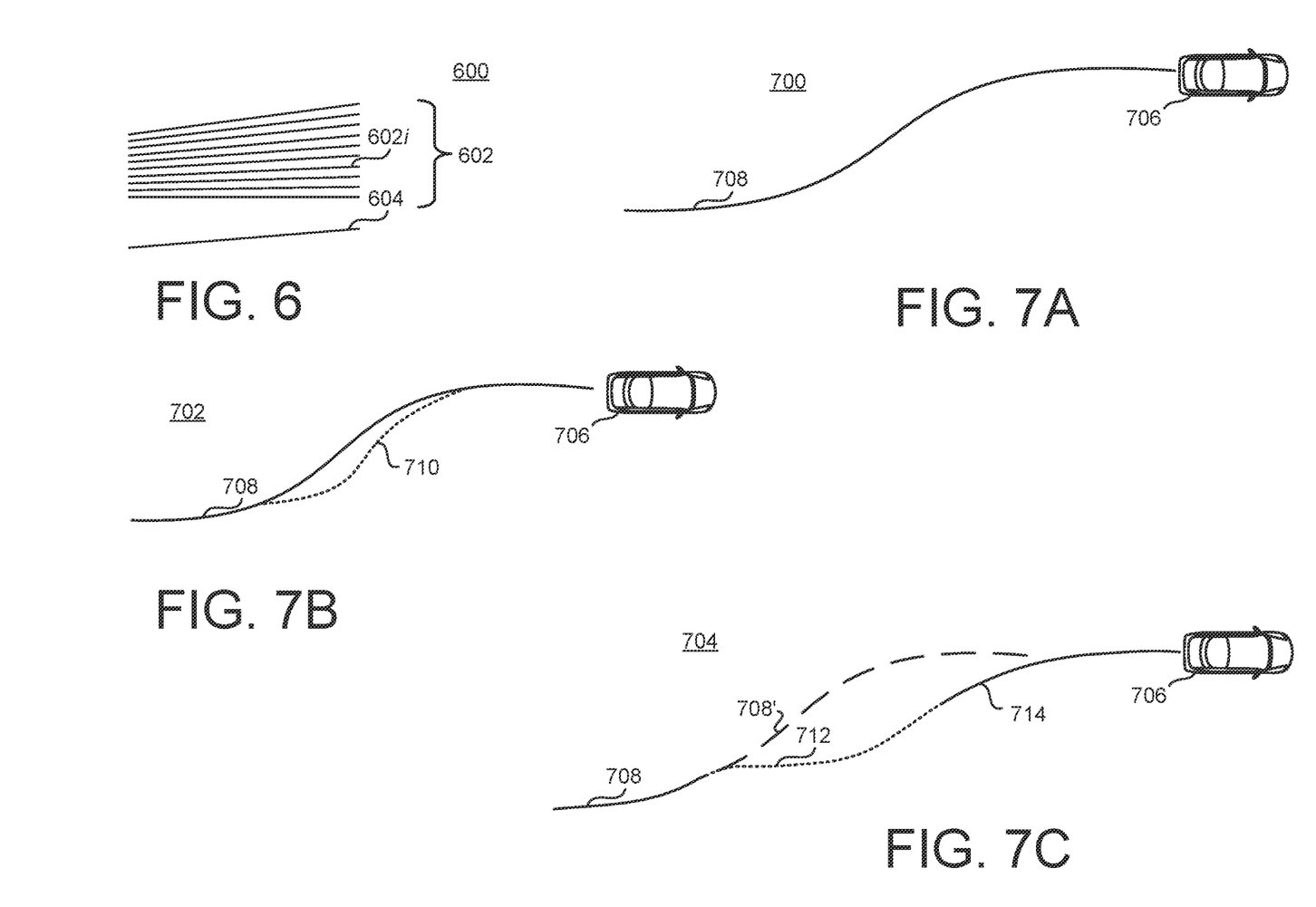
FIG. 6 schematically shows an example of matching a curve.
FIGS. 7A-7C show other examples of controlling motion of a vehicle with reference to a global path.

FIG. 6 schematically shows an example 600 of matching a curve. The example 600 can be used with one or more examples described elsewhere herein. The example 600 schematically represents curves 602. The curves 602 here represent the successive appearances of a target lane (e.g., the target lane center 210 in FIG. 2) as viewed from different vantage points (e.g., in the respective frames of the global path 204 in FIG. 2). The curves 602 may only be a partial set in the present example for simplicity; more or fewer curves 602 can be used. The curves 602 are here represented as straight lines for clarity. In some implementations, the curves 602 can have other shapes.

A curve 604, on the other hand, can be obtained from the output of one or more perception components. The curve 604 represents the current view of the target lane as determined by the local information of at least one sensor of the ego vehicle. To determine the vehicle's current location with regard to the global path, a curve matching can be performed between the curve 604 and some or all of the curves 602. The curve matching can seek to match the curve 604 to one or more of the curves 602. For example, a least squares calculation of differences can be performed for the curve 604 and a curve 602i of the curves 602, where the index i can assume one or more numbers. As another example, the slope of the curve 604 can be compared with the slope of one or more of the curves 602. If the closest match between the curve 604 and at least one of the curves 602 satisfies at least one threshold being applied, this can reflect an affirmative (e.g., "Yes") outcome of the determination in the operation 314 of the method 300 in FIG. 3.

If no match is found in the operation 314, the method 300 can proceed as indicated by arrow 316 and return to the operation 302. For example, if no match is found for the output of the perception component among the states or frames of the global path, then a new global path can be created at that point and be applied going forward. The global path can then replace the originally defined global path in the motion planning. That is, at least operation 302 can then be repeated at one of the times T@t, thus effectively starting anew with a new T@0.

On the other hand, if in the operation 314 a match has been found (e.g., one of the curves 602 fit with the curve 604), that identified set of coefficients in the matrix 502 can be selected in an operation 318 of the method 300. This can correspond to a selection of the best match index i on the global path. As such, while the vehicle may not have been exactly at any of the states or frames of the global path as planned, because it is sufficiently close, that point of the global path is currently taken to be the vehicle's location for purposes of the motion planning. That operation can involve updating a storage 320. For example, the variable $ind_{prev}$ can be assigned the value of the index i of the closest matching entry. That variable $ind_{prev}$ can then be used in a subsequent iteration to perform a limited search of the coefficient matrix, for example as described above.

After the operation 318, the method can provide an output to controllers of the AD system in an operation 322. In some implementations, the output can include at least a portion of a remaining part of the global path as planned. For example, the matrix entry that matched with the perception output can be considered a first set of waypoints, and the perception output can be considered a second set of waypoints; the remaining part of the global path can then be selected as beginning at a point (or phase or frame) of the global path associated with the first set of waypoints.

The above examples illustrate performance of a computer-implemented method that includes at least: initiating, by an assisted-driving system that is controlling motion of a vehicle (e.g., the vehicle 112 in FIG. 1), a lane change of the vehicle from an ego lane (e.g., the ego lane center 208 in FIG. 2) to a target lane (e.g., the target lane center 210 in FIG. 2), the lane change to be performed based only on local information (e.g., output of camera or lidar) of the vehicle; defining, by the assisted-driving system, a parametric representation (e.g., the coefficient matrix in the storage 308 in FIG. 3) of the target lane, the parametric representation based on first waypoints of the target lane (e.g., the waypoints 114 in FIG. 1); receiving, by the assisted-driving system and during the lane change, a first output of a perception component of the vehicle, the first output being the local information and reflecting second waypoints of the target lane (e.g., the local information reflecting the view of the target lane center 210 (FIG. 2) from the current position of the vehicle); performing, by the assisted-driving system, a comparison (e.g., a closest-fit determination in the operation 312 of FIG. 3) based on the first output and the parametric representation; providing, by the assisted-driving system, references of a first global path (e.g., a remainder of the global path 204, or the new global path 220, in FIG. 2) to controllers of the vehicle for actuating the lane change, the references selected based on the comparison (e.g., based on the decision in the operation 314 of FIG. 3).

FIGS. 7A-7C show other examples 700, 702, and 704 of controlling motion of a vehicle with reference to a global path. The examples 700, 702, and/or 704 can be used with one or more other examples described elsewhere herein. The examples 700, 702, and 704 schematically show a vehicle 706 during the course of performing a lane change under control of an AD system. The vehicle is travelling from left to right in the illustrations as directed by the motion planner. In each of the examples 700, 702, and 704, a global path 708 was initially created for the lane change. The examples 700, 702, and 704 illustrate some possible scenarios in the execution of a lane change for the vehicle 706.

In the example 700, the vehicle has remained on the global path 708 from beginning to end of the lane change. Therefore, no path other than the global path 708 is shown in the example 700. In terms of the method 300 (FIG. 3), the example 700 can proceed as follows. The global path 708 can be defined in operation 302, and the other operations 304 and 306 can be performed at the time T@0. At every subsequent time T@t when performing the comparison at the operation 312 and the determination at the operation 314, an essentially exact match is found between the perception output and the coefficient matrix. Because the vehicle 706 remains exactly on the global path 708 in every evaluation, the output to the controllers in the operation 322 is performed each time, and the replanning according to the arrow 316 (FIG. 3) is not performed during the lane change. Due to the inherent inaccuracy of motion controllers and other uncertainties, the example 700 may not always occur but is described here for sake of completeness.

In the example 702, the vehicle has diverged somewhat from the global path 708 and has actually traveled along a path 710 for part of the lane change, as indicated. That is, the route actually undertaken by the vehicle 706 in the example 702 has been on the global path 708 except while traveling on the path 710. In terms of the method 300 (FIG. 3), the example 702 can proceed as follows. The global path 708 can be defined in operation 302, and the other operations 304 and 306 can be performed at the time T@0. At one or more of the subsequent times T@t when the vehicle 706 is still at the path 708, the comparison at the operation 312 and the determination at the operation 314 can result in a closest match (e.g., an exact match) being found between the perception output and the coefficient matrix. Also, at one or more of the subsequent times T@t when the vehicle 706 is at the path 710 and the comparison at the operation 312 and the determination at the operation 314 are being performed, a closest match is found between the perception output and the coefficient matrix. That is, the perception output was within a threshold difference to at least one of the coefficient sets of the matrix 502 (FIG. 5), and therefore the outcome of the operation 314 was "Yes". The replanning according to the arrow 316 (FIG. 3) is therefore not performed during the lane change in the example 702.

In the example 704, the vehicle has diverged more from the global path 708 than in the example 702 and has actually traveled along a path 712 for part of the lane change, as indicated. That is, the route actually undertaken by the vehicle 706 in the example 702 was initially on the global path 708 until the vehicle 706 began traveling on the path 712. In terms of the method 300 (FIG. 3), the example 704 can proceed as follows. The global path 708 can be defined in operation 302, and the other operations 304 and 306 can be performed at the time T@0. At one or more of the subsequent times T@t when the vehicle 706 is on the path 712 and the comparison at the operation 312 and the determination at the operation 314 are being performed, no close match is found between the perception output and the coefficient matrix. That is, the perception output is not within a threshold difference to at least one of the coefficient sets of the matrix 502 (FIG. 5), and therefore the outcome of the operation 314 was "No". The method 300 can therefore perform replanning according to the arrow 316 (FIG. 3) by returning to the operation 302. As such, at some point in time (e.g., at one of the T@t in FIG. 3), a new global path 714 can be defined in the example 704, and the new global path 714 can be provided to the controllers by the AD system instead of a remainder of the global path 708. That is, the new global path 714 can be defined to replace the global path 708 that was defined earlier in the lane change. As such, a portion 708' of the global path 708 is here not used (e.g., followed by the controllers of the AD system) due to the generation of the new global path 714.

Figure 8:
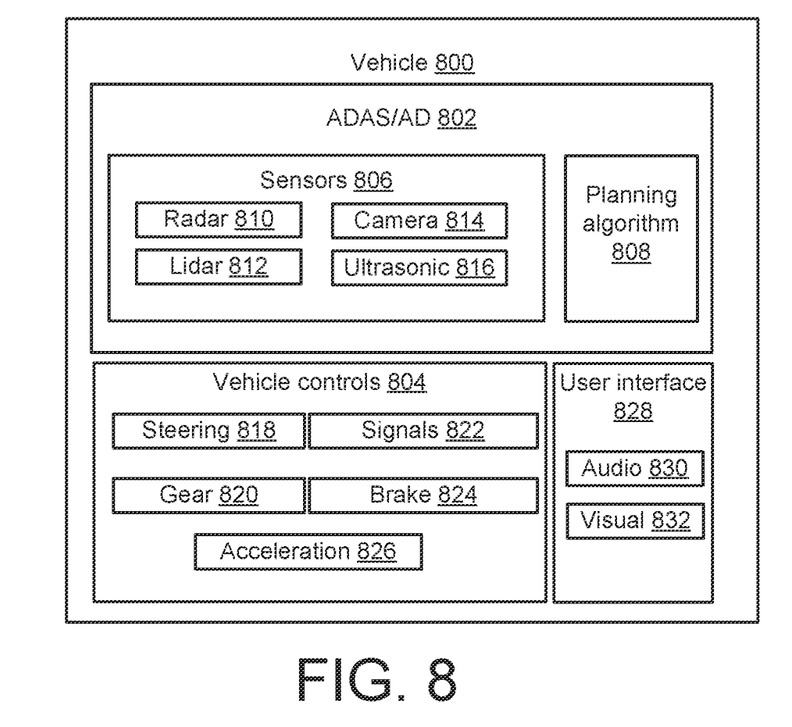
FIG. 8 shows an example of a vehicle.

FIG. 8 shows an example of a vehicle 800. The vehicle 800 can be used with one or more other examples described elsewhere herein. The vehicle 800 includes an ADAS/AD system 802 and vehicle controls 804. The ADAS/AD system 802 can be implemented using some or all components described with reference to FIG. 9 below. The ADAS/AD system 802 includes sensors 806 and a planning algorithm 808. Other aspects that the vehicle 800 may include, including, but not limited to, other components of the vehicle 800 where the ADAS/AD system 802 may be implemented, are omitted here for simplicity.

The sensors 806 as described here also include appropriate circuitry and/or executable programming for processing sensor output and performing a detection based on the processing. Such circuitry and/or executable programming can be implemented in the same physical housing as the sensing component that performs the sensing of the environment, or can be implemented separately therefrom. The sensors 806 can include a radar 810. In some implementations, the radar 810 can include any object detection system that is based at least in part on radio waves. For example, the radar 810 can be oriented in a forward direction relative to the vehicle and can be used for detecting at least a distance to one or more other objects (e.g., another vehicle). The radar 810 can detect a traffic event by sensing the presence of an object in relation to the vehicle 800. For example, the radar 810 can be used during a lane change of the vehicle 800.

The sensors 806 can include a lidar 812. In some implementations, the lidar 812 can include any object detection system that is based at least in part on laser light. For example, the lidar 812 can be oriented in any direction relative to the vehicle and can be used for detecting at least a distance to one or more other objects (e.g., a lane or another vehicle). The lidar 812 can detect a traffic event by sensing the presence of an object in relation to the vehicle 800. For example, the lidar 812 can be used during a lane change of the vehicle 800.

The sensors 806 can include a camera 814. In some implementations, the camera 814 can include any image sensor whose signal(s) the vehicle 800 takes into account. For example, the camera 814 can be oriented in any direction relative to the vehicle and can be used for detecting vehicles, lanes, lane markings, and/or road signage. The camera 814 can detect a traffic event by visually registering a circumstance in relation to the vehicle 800. For example, the camera 814 can be used during a lane change of the vehicle 800.

The sensors 806 can include an ultrasonic sensor 816. In some implementations, the ultrasonic sensor 816 can include any transmitter, receiver, and/or transceiver used in detecting at least the proximity of an object based on ultrasound. For example, the ultrasonic sensor 816 can be positioned at or near an outer surface of the vehicle. The ultrasonic sensor 816 can detect a traffic event by sensing the presence of an object in relation to the vehicle 800. For example, the ultrasonic sensor 816 can be used during a lane change of the vehicle 800.

Any of the sensors 806 alone, or two or more of the sensors 806 collectively, can generate, while the ADAS/AD system 802 is controlling motion of the vehicle 800, an output of local information. In some implementations, such output can be taken into account in performing a lane change. In some implementations, one or more other types of sensors can additionally or instead be included in the sensors 806.

The planning algorithm 808 can plan for the ADAS/AD system 802 to perform one or more actions, or to not perform any action, in response to one or more detections. The output of one or more of the sensors 806 can be taken into account. In some implementations, the planning algorithm 808 can define a velocity increase and/or reduction, and/or a lateral offset change, to name just two examples.

The vehicle controls 804 can include a steering control 818. In some implementations, the ADAS/AD system 802 and/or another driver of the vehicle 800 controls the trajectory of the vehicle 800 by adjusting a steering angle of at least one wheel by way of manipulating the steering control 818. The steering control 818 can be configured for controlling the steering angle though a mechanical connection between the steering control 818 and the adjustable wheel, or can be part of a steer-by-wire system.

The vehicle controls 804 can include a gear control 820. In some implementations, the ADAS/AD system 802 and/or another driver of the vehicle 800 uses the gear control 820 to choose from among multiple operating modes of a vehicle (e.g., a Drive mode, a Neutral mode, or a Park mode). For example, the gear control 820 can be used to control an automatic transmission in the vehicle 800.

The vehicle controls 804 can include signal controls 822. In some implementations, the signal controls 822 can control one or more signals that the vehicle 800 can generate. For example, the signal controls 822 can control a turn signal and/or a horn of the vehicle 800.

The vehicle controls 804 can include brake controls 824. In some implementations, the brake controls 824 can control one or more types of braking systems designed to slow down the vehicle, stop the vehicle, and/or maintain the vehicle at a standstill when stopped. For example, the brake controls 824 can be actuated by the ADAS/AD system 802. As another example, the brake controls 824 can be actuated by the driver using a brake pedal.

The vehicle controls 804 can include an acceleration control 826. In some implementations, the acceleration control 826 can control one or more types of propulsion motor of the vehicle. For example, the acceleration control 826 can control the electric motor(s) and/or the internal-combustion motor(s) of the vehicle 800.

The vehicle 800 can include a user interface 828. The user interface 828 can include an audio interface 830. In some implementations, the audio interface 830 can include one or more speakers positioned in the passenger compartment. For example, the audio interface 830 can at least in part operate together with an infotainment system in the vehicle.

The user interface 828 can include a visual interface 832. In some implementations, the visual interface 832 can include at least one display device in the passenger compartment of the vehicle 800. For example, the visual interface 832 can include a touchscreen device and/or an instrument cluster display.

Figure 9:
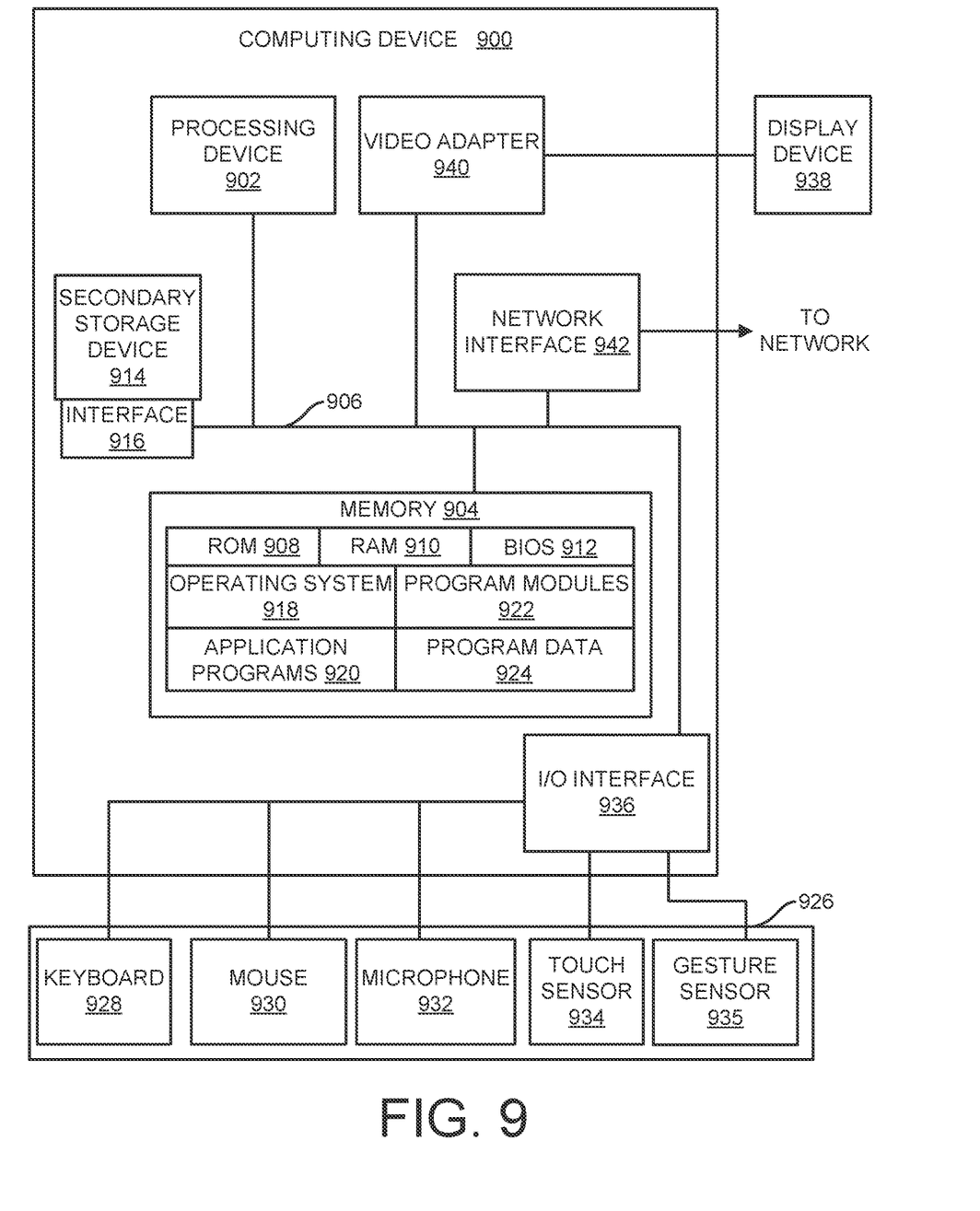
FIG. 9 illustrates an example architecture of a computing device 900 that can be used to implement aspects of the present disclosure.

FIG. 9 illustrates an example architecture of a computing device 900 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 9 can be used to execute the operating system, application programs, and/or software modules (including the software engines) described herein.

The computing device 900 includes, in some embodiments, at least one processing device 902 (e.g., a processor), such as a central processing unit (CPU). A variety of processing devices are available from a variety of manufacturers, for example, Intel or Advanced Micro Devices. In this example, the computing device 900 also includes a system memory 904, and a system bus 906 that couples various system components including the system memory 904 to the processing device 902. The system bus 906 is one of any number of types of bus structures that can be used, including, but not limited to, a memory bus, or memory controller; a peripheral bus; and a local bus using any of a variety of bus architectures.

Examples of computing devices that can be implemented using the computing device 900 include a desktop computer, a laptop computer, a tablet computer, a mobile computing device (such as a smart phone, a touchpad mobile digital device, or other mobile devices), or other devices configured to process digital instructions.

The system memory 904 includes read only memory 908 and random access memory 910. A basic input/output system 912 containing the basic routines that act to transfer information within computing device 900, such as during start up, can be stored in the read only memory 908.

The computing device 900 also includes a secondary storage device 914 in some embodiments, such as a hard disk drive, for storing digital data. The secondary storage device 914 is connected to the system bus 906 by a secondary storage interface 916. The secondary storage device 914 and its associated computer readable media provide non-volatile and non-transitory storage of computer readable instructions (including application programs and program modules), data structures, and other data for the computing device 900.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 914 and/or system memory 904, including an operating system 918, one or more application programs 920, other program modules 922 (such as the software engines described herein), and program data 924. The computing device 900 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 900 through one or more input devices 926. Examples of input devices 926 include a keyboard 928, mouse 930, microphone 932 (e.g., for voice and/or other audio input), touch sensor 934 (such as a touchpad or touch sensitive display), and gesture sensor 935 (e.g., for gestural input). In some implementations, the input device(s) 926 provide detection based on presence, proximity, and/or motion. In some implementations, a user may walk into their home, and this may trigger an input into a processing device. For example, the input device(s) 926 may then facilitate an automated experience for the user. Other embodiments include other input devices 926. The input devices can be connected to the processing device 902 through an input/output interface 936 that is coupled to the system bus 906. These input devices 926 can be connected by any number of input/output interfaces, such as a parallel port, serial port, game port, or a universal serial bus. Wireless communication between input devices 926 and the input/output interface 936 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 938, such as a monitor, liquid crystal display device, light-emitting diode display device, projector, or touch sensitive display device, is also connected to the system bus 906 via an interface, such as a video adapter 940. In addition to the display device 938, the computing device 900 can include various other peripheral devices (not shown), such as speakers or a printer.

The computing device 900 can be connected to one or more networks through a network interface 942. The network interface 942 can provide for wired and/or wireless communication. In some implementations, the network interface 942 can include one or more antennas for transmitting and/or receiving wireless signals. When used in a local area networking environment or a wide area networking environment (such as the Internet), the network interface 942 can include an Ethernet interface. Other possible embodiments use other communication devices. For example, some embodiments of the computing device 900 include a modem for communicating across the network.

The computing device 900 can include at least some form of computer readable media. Computer readable media includes any available media that can be accessed by the computing device 900. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 900.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 9 is also an example of programmable electronics, which may include one or more such computing devices, and when multiple computing devices are included, such computing devices can be coupled together with a suitable data communication network so as to collectively perform the various functions, methods, or operations disclosed herein.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:
1. A computer-implemented method comprising:
initiating, by an assisted-driving system that is controlling motion of a vehicle, a lane change of the vehicle from an ego lane to a target lane, the lane change to be performed based only on local information of the vehicle;
wherein actuating the lane change comprises performing multiple iterations of computer-implemented operations, each respective one of the multiple iterations including:

defining, by the assisted-driving system, a parametric representation of the target lane, the parametric representation based on first waypoints of the target lane;

receiving, by the assisted-driving system, a first output of a perception component of the vehicle, the first output being the local information and reflecting second waypoints of the target lane;

performing, by the assisted-driving system, a comparison based on the first output and the parametric representation; and controlling vehicle motion using controllers of the vehicle, wherein the assisted-driving system provides references of a first global path to the controllers of the vehicle for actuating a portion of the lane change corresponding to the respective one of the multiple iterations, the references selected based on the comparison.

2. The computer-implemented method of claim 1, wherein the comparison is performed to find a best fit for the second waypoints among the first waypoints.

3. The computer-implemented method of claim 1, wherein the first global path is defined at an outset of the lane change, the computer-implemented method further comprising defining, by the assisted-driving system, a transformation matrix between an origin of the lane change and each of multiple points along the first global path.

4. The computer-implemented method of claim 3, further comprising using the transformation matrix in defining the parametric representation.

5. The computer-implemented method of claim 1, wherein the parametric representation comprises coefficients for a polynomial.

6. The computer-implemented method of claim 5, wherein the polynomial is a third-order polynomial.

7. The computer-implemented method of claim 5, wherein the first output includes first x,y-coordinates, the computer-implemented method further comprising generating second x,y-coordinates from the parametric representation, wherein the comparison is performed using the first and second x,y-coordinates.

8. The computer-implemented method of claim 5, wherein the parametric representation forms a plurality of first curves, wherein the first output forms a second curve, and wherein the comparison seeks to match the second curve to at least one of the plurality of first curves.

9. The computer-implemented method of claim 5, further comprising forming a coefficient matrix of the coefficients.

10. The computer-implemented method of claim 1, wherein the controllers include at least a steering control or an acceleration control.

11. The computer-implemented method of claim 1, wherein the comparison includes a determination whether the second waypoints are within a threshold of at least one set of the first waypoints.

12. The computer-implemented method of claim 11, wherein the first global path is defined at an outset of the lane change, wherein the comparison matches the second waypoints with a first set of the first waypoints, the first set of the first waypoints associated with a first point along the first global path, and wherein the references are selected from the first global path beginning at the first point.

13. The computer-implemented method of claim 12, wherein the references are selected from the first global path beginning at the first point although the vehicle is not at a location corresponding to the first point.

14. The computer-implemented method of claim 12, further comprising receiving a second output of the perception component, and repeating the comparison based on the second output, wherein if the threshold is not met for the second output, a second global path is defined.

15. The computer-implemented method of claim 12, wherein performing the comparison comprises performing a one-directional search of the first waypoints.

16. The computer-implemented method of claim 11, wherein the comparison indicates that the second waypoints are not within the threshold of any set of the first waypoints, the computer-implemented method further comprising defining the first global path in response to the comparison.

17. The computer-implemented method of claim 16, wherein the first global path is defined to replace a second global path that had been defined earlier in the lane change.

18. A computer program product tangibly embodied in a non-transitory storage medium, the computer program product including instructions that when executed cause a processor to perform operations, the operations comprising:

initiating, by an assisted-driving system that is controlling motion of a vehicle, a lane change of the vehicle from an ego lane to a target lane, the lane change to be performed based only on local information of the vehicle;

wherein actuating the lane change comprises performing multiple iterations of computer-implemented operations, each respective one of the multiple iterations including:

defining, by the assisted-driving system, a parametric representation of the target lane, the parametric representation including first waypoints of the target lane;

receiving, by the assisted-driving system, a first output of a perception component of the vehicle, the first output being the local information and reflecting second waypoints of the target lane;

performing, by the assisted-driving system, a comparison based on the first output and the parametric representation; and controlling vehicle motion using controllers of the vehicle, wherein the assisted-driving system provides references of a first global path to the controllers of the vehicle for actuating a portion of the lane change corresponding to the respective one of the multiple iterations, the references selected based on the comparison.

19. The computer-implemented method of claim 9, wherein the comparison comprises looking only at matrix entries in the coefficient matrix in a number of iterations as follows:

for $i = ind_{prev} - \text{window} : ind_{prev} + \text{window}$, where i is a matrix index for entries to be considered, the matrix index being iterated between values defined before and after the colon; $ind_{prev}$ is an index of a previously identified closest matrix entry; and window is a range of matrix entries to be searched on either side of the previously identified closest matrix entry.

20. The computer-implemented method of claim 9, wherein the first global path includes discretized states, wherein the coefficient matrix includes rows, and wherein each of the rows corresponds to a respective one of the discretized states.

* * * * *